(12) United States Patent
Casamona et al.

(10) Patent No.: US 8,280,112 B2
(45) Date of Patent: Oct. 2, 2012

(54) SYSTEM AND METHOD FOR PREDICTING OBJECT LOCATION

(75) Inventors: David L. Casamona, Orlando, FL (US); Christopher C. Pond, Orlando, FL (US); Anthony J. Bailey, Wallingford, CT (US)

(73) Assignee: Disney Enterprises, Inc., Burbank, CA (US)

( * ) Notice: Subject to any disclaimer, the term of this patent is extended or adjusted under 35 U.S.C. 154(b) by 353 days.

(21) Appl. No.: 12/751,041

(22) Filed: Mar. 31, 2010

(65) Prior Publication Data
US 2011/0243377 A1 Oct. 6, 2011

(51) Int. Cl.
*G06K 9/00* (2006.01)
*A63B 57/00* (2006.01)

(52) U.S. Cl. .................... 382/103; 382/291; 473/222

(58) Field of Classification Search .................. 382/100, 382/103, 106–107, 154, 168, 173, 181, 209, 382/214, 219, 232, 254, 274, 276, 288–295, 382/305, 312; 473/222; 342/74
See application file for complete search history.

(56) References Cited

U.S. PATENT DOCUMENTS

| | | | |
|---|---|---|---|
| 5,489,099 A | | 2/1996 | Rankin et al. |
| 6,178,265 B1 | | 1/2001 | Haghighi |
| 6,262,680 B1 * | | 7/2001 | Muto ............................. 342/74 |
| 6,304,665 B1 * | | 10/2001 | Cavallaro et al. ............ 382/106 |
| 6,445,815 B1 * | | 9/2002 | Sato ............................. 382/154 |
| 6,724,915 B1 * | | 4/2004 | Toklu et al. .................. 382/103 |
| 2004/0131232 A1 | | 7/2004 | Meisner et al. |
| 2005/0153786 A1 | | 7/2005 | Petrov |
| 2006/0013440 A1 | | 1/2006 | Cohen et al. |
| 2007/0035562 A1 | | 2/2007 | Azuma et al. |
| 2008/0199043 A1 * | | 8/2008 | Forsgren ....................... 382/103 |
| 2008/0226127 A1 | | 9/2008 | Brodsky et al. |
| 2008/0279421 A1 | | 11/2008 | Hamza et al. |
| 2009/0046897 A1 | | 2/2009 | Rowsell et al. |
| 2009/0052779 A1 | | 2/2009 | Kakinami et al. |
| 2009/0082122 A1 * | | 3/2009 | Kellogg ........................ 473/222 |

OTHER PUBLICATIONS

Han et al.; A Real-Time Augmented Reality System for Sports Broadcast Video Enhancement; University of Technology Eindhoven; Sep. 23-28, 2007; pp. 1-4.

(Continued)

*Primary Examiner* — Seyed Azarian
(74) *Attorney, Agent, or Firm* — Smith Risley Tempel Santos LLC; Michael J. Tempel (57) ABSTRACT

A system for predicting object location includes a video capture system for capturing a plurality of video frames, each of the video frames having a first area, an object isolation element for locating an object in each of the plurality of video frames, the object being located at a first actual position in a first video frame and being located at a second actual position in a second video frame, and a trajectory calculation element configured to analyze the first actual position and the second actual position to determine an object trajectory, the object trajectory comprising past trajectory and predicted future trajectory, wherein the predicted future trajectory is used to determine a second area in a subsequent video frame in which to search for the object, wherein the second area is different in size than the first area.

17 Claims, 7 Drawing Sheets

OTHER PUBLICATIONS

Dobie, et al., "Object tracking in multimedia systems," International Conference on Image Processing and its Applications, Jan. 1992, pp. 41-44.

Zupancic, et al., "Automatic Golf Ball Trajectory Reconstruction and Visualization," Computer Vision/Computer Graphics Collaboration Techniques, May 2009, pp. 150-160.

Takahashi, et al., "Development of ball trajectory visualization system for live baseball broadcasts and application to other sports," Broadcast Technology, No. 38, Jan. 2009, pp. 2-8.

Kendoul, et al., "Three Nested Kalman Filters-Based Algorithm for Real-Time Estimation of Optical Flow, UAV Motion and Obstacles Detection," 2007 IEEE International Conference on Robotics and Automation, Apr. 2007, pp. 4746-4751.

* cited by examiner

SYSTEM AND METHOD FOR PREDICTING OBJECT LOCATION

BACKGROUND

In many televised activities, it is desirable to anticipate the location of an object or a person performing a certain action and display the location in as near real-time as possible. In the past, images have been captured and image recognition technology has been employed to predict the future location of an object or an individual. These prior systems typically use multiple cameras or specialized cameras. Unfortunately, it is difficult to anticipate the future location of an object or an individual due to, for example, background noise in the images, wind, and other factors.

Therefore, there is a need for a way of effectively predicting the future location of an object or an individual.

SUMMARY

Embodiments of a system for predicting object location comprise a video capture system for capturing a plurality of video frames, each of the video frames having a first area, an object isolation element for locating an object in each of the plurality of video frames, the object being located at a first actual position in a first video frame and being located at a second actual position in a second video frame, and a trajectory calculation element configured to analyze the first actual position and the second actual position to determine an object trajectory, the object trajectory comprising past trajectory and predicted future trajectory, wherein the predicted future trajectory is used to determine a second area in a subsequent video frame in which to search for the object, wherein the second area is different in size than the first area.

Other embodiments are also provided. Other systems, methods, features, and advantages of the invention will be or become apparent to one with skill in the art upon examination of the following figures and detailed description. It is intended that all such additional systems, methods, features, and advantages be included within this description, be within the scope of the invention, and be protected by the accompanying claims.

BRIEF DESCRIPTION OF THE FIGURES

The invention can be better understood with reference to the following figures. The components within the figures are not necessarily to scale, emphasis instead being placed upon clearly illustrating the principles of the invention. Moreover, in the figures, like reference numerals designate corresponding parts throughout the different views.

DETAILED DESCRIPTION

The system and method for predicting object location will be described in the context of detecting a past trajectory of an object and predicting the future location of the object based on a predicted future trajectory. However, the system and method for predicting object location is applicable to predicting the future location of an object using other criteria. Further, while the system and method for predicting object location will be described below using a primary example of predicting and displaying a relative height of an object, for example, the jump height of an athlete, the system and method for predicting object location can be used for predicting the location of any object.

The system and method for predicting object location can be implemented in hardware, software, or a combination of hardware and software using a general purpose computing device. Portions of the system and method for predicting object location are implemented in software. The software can be stored in a memory and executed by a suitable instruction execution system (microprocessor). The hardware portions of the system and method for predicting object location can include any or a combination of the following technologies, which are all well known in the art: discrete electronic components, a discrete logic circuit(s) having logic gates for implementing logic functions upon data signals, an application-specific integrated circuit having appropriate logic gates, a programmable gate arrays) (PGA), a field programmable gate array (FPGA), etc.

The software for the system and method for predicting object location comprises an ordered listing of executable instructions for implementing logical functions, and can be embodied in any computer-readable medium for use by or in connection with an instruction execution system, apparatus, or device, such as a computer-based system, processor-containing system, or other system that can fetch the instructions from the instruction execution system, apparatus, or device and execute the instructions.

In the context of this document, a "computer-readable medium" can be any means that can contain, store, communicate, propagate, or transport the program for use by or in connection with the instruction execution system, apparatus, or device. The computer-readable medium can be, for example but not limited to, an electronic, magnetic, optical, electromagnetic, infrared, or semiconductor system, apparatus, device, or propagation medium. More specific examples (a non-exhaustive list) of the computer-readable medium would include the following: a portable computer diskette (magnetic), a random access memory (RAM), a read-only memory (ROM), an erasable programmable read-only memory (EPROM or Flash memory) (magnetic), an optical fiber (optical), and a portable compact disc read-only memory (CDROM) (optical). Note that the computer-readable medium could even be paper or another suitable medium upon which the program is printed, as the program can be electronically captured, via for instance, optical scanning of the paper or other medium, then compiled, interpreted or otherwise processed in a suitable manner if necessary, and then stored in a computer memory.

Figure 1:
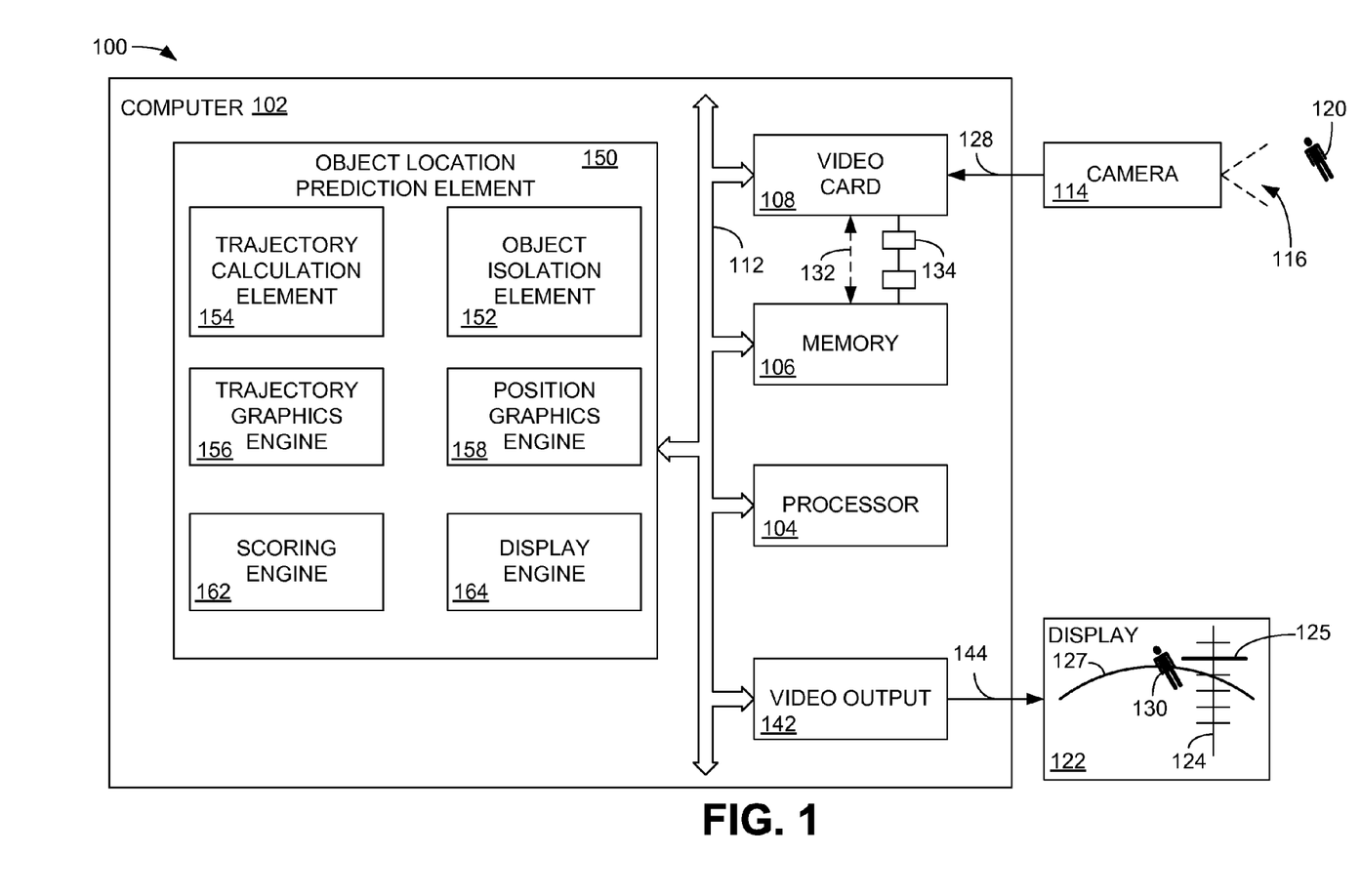
FIG. 1 is a block diagram illustrating an example of a system for predicting object location.

FIG. 1 is a block diagram illustrating an example of a system for predicting object location. The system 100 comprises a general-purpose computer 102, a video camera 114 and a display 122. The general-purpose computer 102 can be any generally available computing device, such as a desktop computer, a laptop computer, or any other computer and will be referred to as a computer 102. The video camera 114 can be any generally available video camera, and in an embodiment, can be a video camera used to capture video images of an object 120 that will be processed and broadcast on television. In an embodiment, the object 120 can be an athlete engaging in a sporting event where it is desirable to determine and show to an audience a position of the object 120 relative to a gauge or other means to measure height, location, or another attribute relating to the position of the object 120. However, the object 120 need not be an athlete engaging in a sporting event. The object 120 can be any object, the relative position of which is sought to be determined and displayed. The video camera 114 has a field of view 116 within which the object 120 can be captured.

The computer 102 comprises a processor 104, a memory 106, a video card 108, an object location prediction element 150, and a video output element 142, coupled together over a logical interface 112. The logical interface 112 can be an internal system bus, a multiplexed communication channel, or any other logical interface over which elements within a computer 102 can communicate with each other. Further, the computer 102 includes a number of other elements, both hardware and software, which are not shown for simplicity of illustration, but which are known to those having ordinary skill in the art.

The processor 104 can be a stand-alone microprocessor, a distributed processor, or any other processor that can execute instructions within the computer 102. The memory 106 can be static or dynamic memory, can be volatile or nonvolatile memory, or can be any single or distributed memory that can be accessed by the various elements coupled over the logical interface 112.

In an embodiment, the object location prediction element 150 can comprise one or more software code portions that can be stored within the memory 106 and which can be executed by the processor 104. Alternatively, the object location prediction element 150 can be one or more firmware elements that can be embodied in an application specific integrated circuit (ASIC), a field programmable gate array (FPGA) or any other logical execution element.

In an embodiment, the object location prediction element 150 is a software element comprising software code, and includes a number of different modules. In the embodiment described herein, the object location prediction element 150 includes an object isolation element 152, a trajectory calculation element 154, a position graphics engine 158, a trajectory graphics engine 156, a scoring engine 162 and a display engine 164.

In an embodiment, the object isolation element 152 receives a video frame and operates on the video frame to determine the position of an object within the frame. In an embodiment, the trajectory calculation element 154 analyzes the position of an object over at least two frames to capture a past trajectory and to predict a future trajectory of the object.

In an embodiment, the position graphics engine 158 communicates to the display engine 164 the location to display an indicator on a gauge in the display. In an embodiment, the trajectory graphics engine 156 communicates to the display engine 164 the location to display the past and predicted trajectory of the object 120. In an embodiment, the scoring engine 162 communicates to the display engine 164 the location of the object 120.

In an embodiment, the display engine 164 is configured to display a spline curve representation of the predicted trajectory determined by the trajectory calculation element 154. As used herein, the term "spline curve" refers to a piecewise polynomial (parametric) curve. As known in the art, a spline curve can be used to approximate complex shapes through curve fitting and interactive curve design.

As a general overview of an exemplary embodiment, the video camera 114 provides video over connection 128 to the video card 108. The video can be what is referred to as "live" in that it can be a real-time live video feed. Alternatively, video frames can be provided to the video card 108 using other means, such as, for example, on a memory element as recorded video.

The video card 108 parses the received video into individual frames which are stored by the memory 106. The transfer of video frames between the video card 108 and the memory 106 is a schematically shown using the dotted arrow 132 and video frames 134. However, the transfer of video frames 134 between the video card 108 and the memory 106 occurs over the logical interface 112.

Individual video frames 134 are analyzed by the object location prediction element 150 to determine the location of an object within a video frame and to predict the future location of the object in a subsequent video frame. The display engine 164 allows the video output element 142 to provide a video signal over connection 144 so that a video feed including the predicted location of the object can be shown on the display 122. For example, a representation 130 of the object 120 is shown on the display 122 relative to a gauge 124. In this example, the gauge 124 can be a height meter and includes an indicator 125. The location of the indicator 125 can be controlled by the position graphics engine 158 to illustrate the height of the representation 130 relative to the gauge 124. In an embodiment using television broadcast as an example, the height meter 124 can be referred to as a "Huck tower."

Figure 2A:
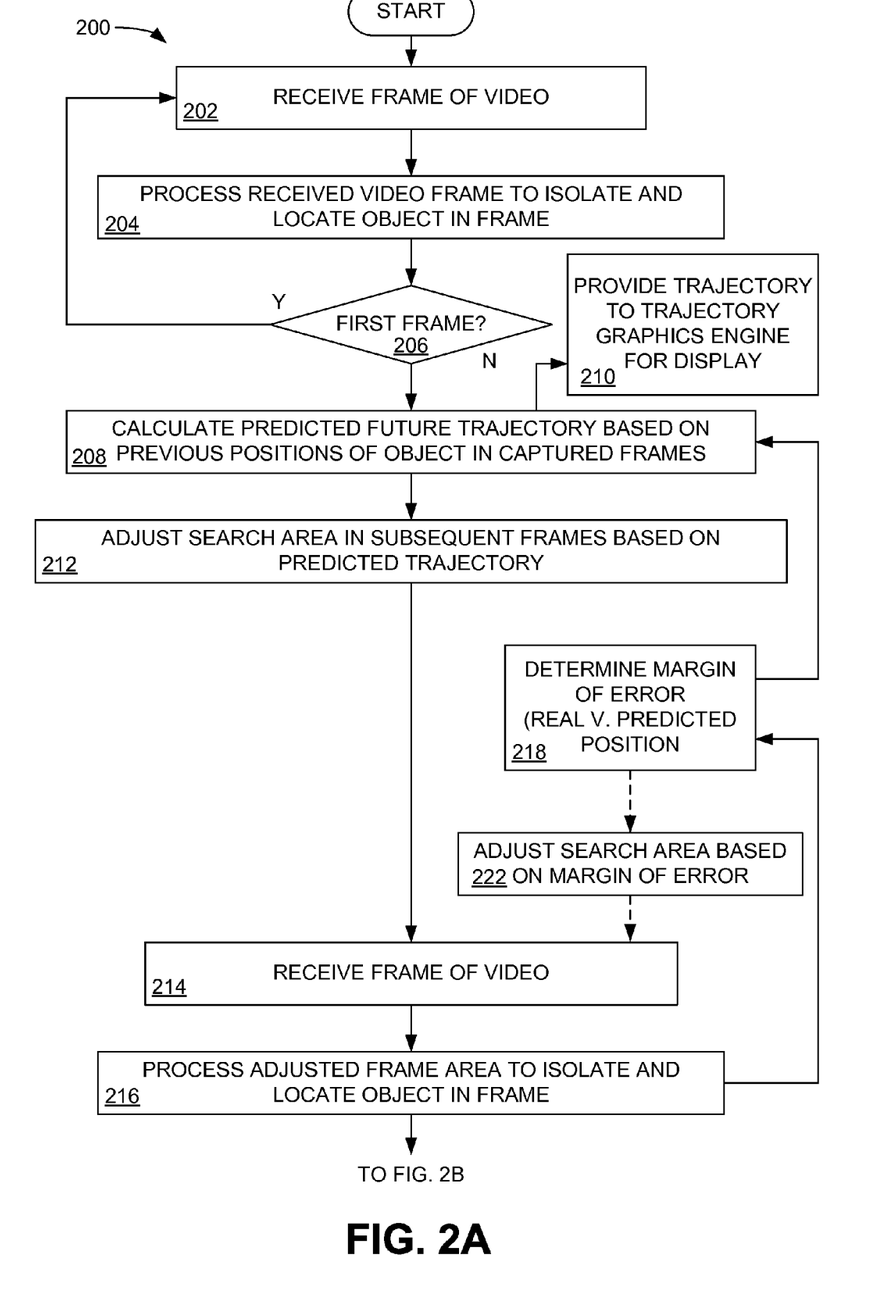
FIGS. 2A and 2B are a flowchart collectively illustrating the operation of an embodiment of a method for predicting object location.
Figure 2B:
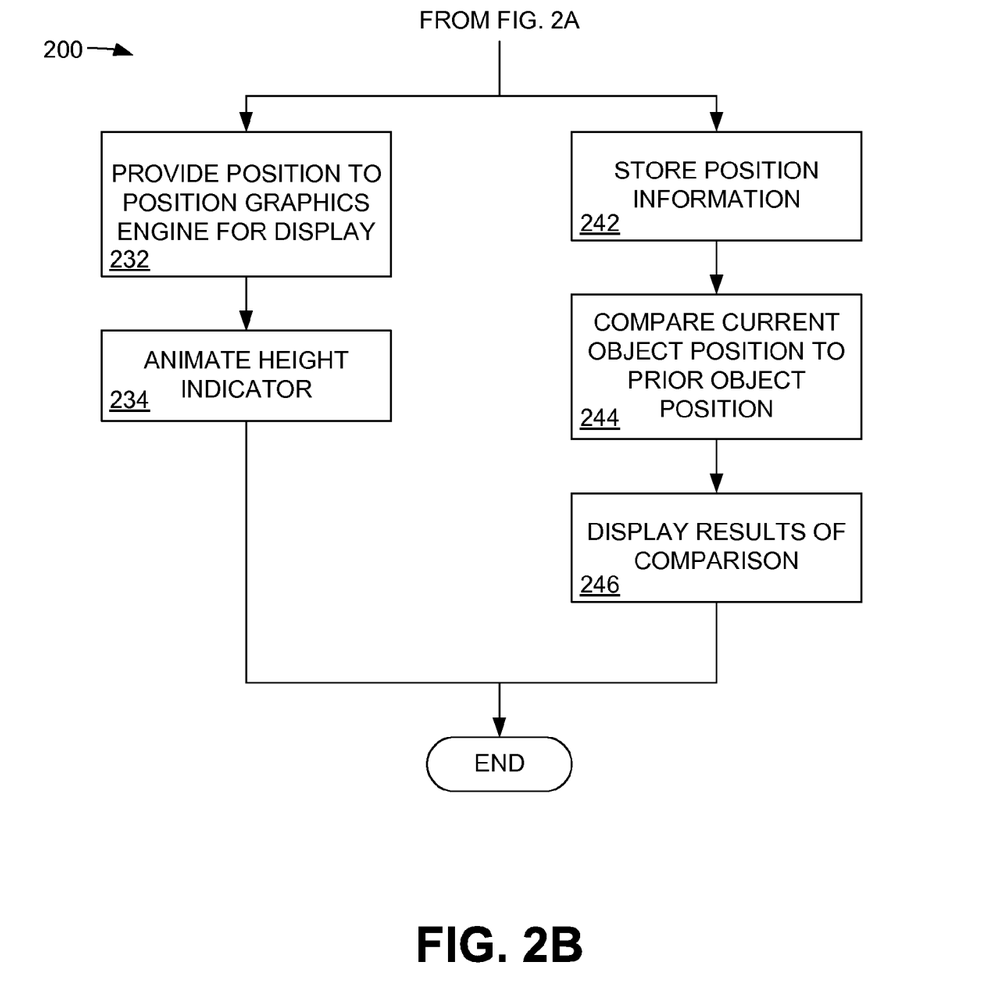

FIGS. 2A and 2B are a flowchart 200 collectively illustrating the operation of an embodiment of a method for predicting object location. The blocks in the flowchart 200 can be performed in or out of the order shown, and in some instances can be performed in parallel. Further, the description of the flowchart 200 will make reference to the elements in FIGS. 1, 3 and 4.

In block 202 the object location prediction element 150 receives a first frame of video from the memory 106. In block 204, the object isolation element 152 processes the received frame to isolate and locate an object in the frame. For example, with reference to FIG. 3, a first frame 302 includes an object 310*a* shown in a first position. In block 204, the object isolation element 152 analyzes the entire first frame 302 to locate the object 310*a*. In an embodiment, a resolution of the camera 114 is 1280×720 pixels, also referred to as 720p. Therefore, the first frame 302 (and all subsequent frames) has a resolution of 1280 horizontal pixels×720 vertical pixels. However, the resolution of the camera 114 and the number of pixels in a frame are arbitrary. Indeed, the ability of the system to process a frame is determined by the processing power of the processor 104 and the size of the memory 106.

Figure 3:
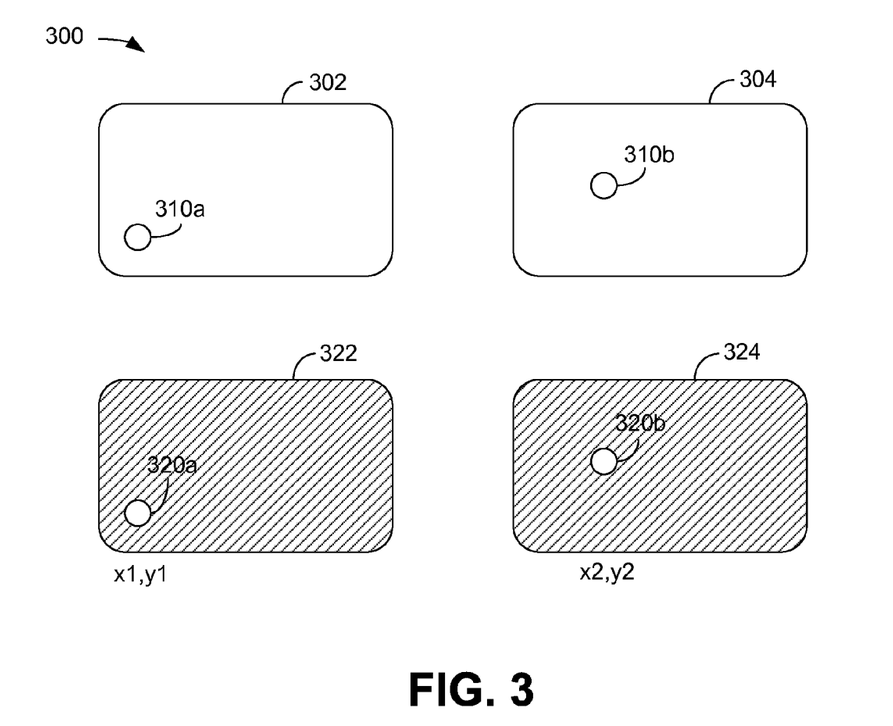
FIG. 3 is a schematic illustration showing a series of frames having an object to be located.

Still referring to FIG. 3, the search area is shown in crosshatching in frame 322 as including the entire frame. The object 320*a* is located at a first position, referred to in two dimensional Cartesian coordinates as {x1, y1}. However, other object location coordinate systems can be used. The frame 324 shows the entire frame being searched and the object being located in the second position, illustrated at 320*b*. The position of the object 320*b* in the frame 324 is referred to as {x2, y2}. Mathematical operations can be performed on the locations {x1, y1} and {x2, y2} to determine the difference in the position of the two objects.

Figure 4:
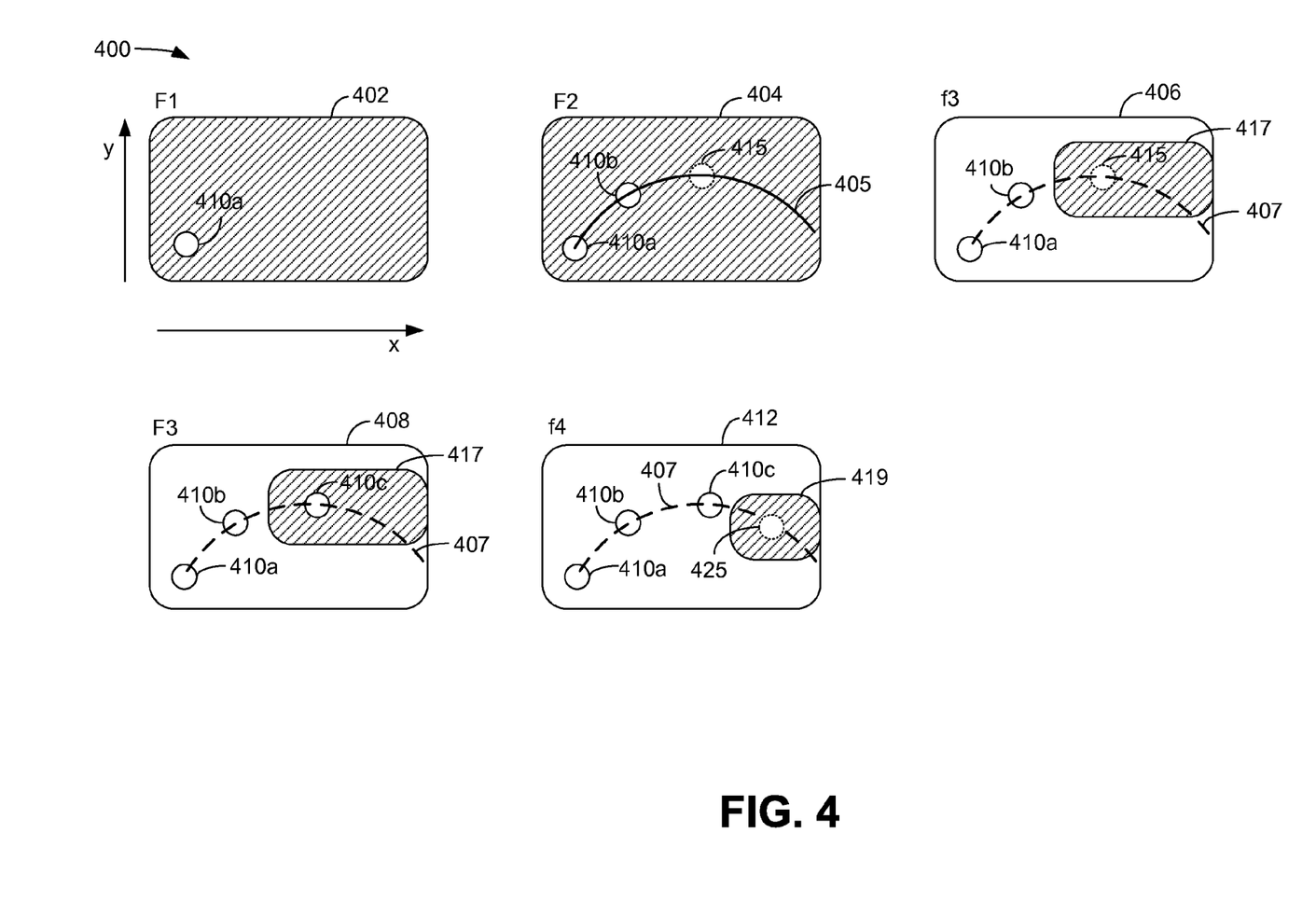
FIG. 4 is a schematic illustration showing the operation of an embodiment of the system and method for predicting object location.
Figure 5:
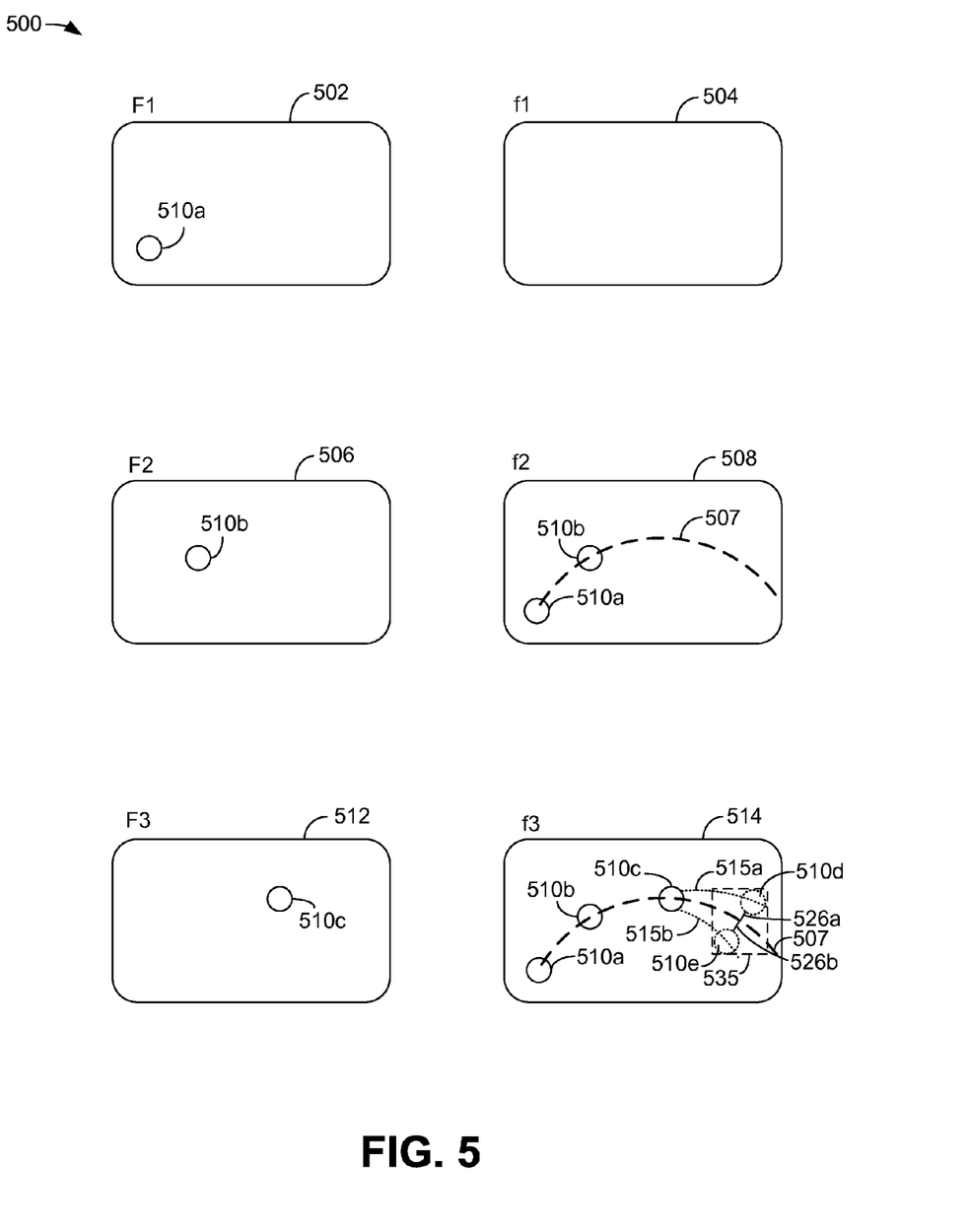
FIG. 5 is a schematic diagram illustrating actual frames and predicted frames.

The operation of the object isolation element 152 is also schematically shown in FIG. 4, where a first frame 402 is analyzed to locate an object 410*a*, which is shown in a first position. The crosshatching shown in first frame 402 indicates that the object isolation element 152 processes the entire frame 402 (having 1280×720 pixels) to locate the object 410*a*. In an embodiment, the object isolation element 152 comprises software code that implements known object recognition/isolation techniques. For example, the object isolation element 152 can implement a known isolation technique, such as using a combination of image subtraction and averaging. Actual frames in FIG. 4 and FIG. 5 are referred to using the nomenclature "F," and predicted frames are referred to in FIG. 4 and FIG. 5 using the nomenclature "f."

In block 206 it is determined whether the frame processed in block 204 is the first video frame. If the frame is the first video frame, then, the process returns to block 202 to receive at least a second video frame. The second video frame is processed by block 204 in the same manner described above. With reference to FIGS. 3 and 4, a second frame 304 includes an object 310b. The object 310b is the same object as object 310a, but is shown in a second position, hence it is denoted as "b."Similarly, with regard to FIG. 4, an object 410b is shown in second frame 404, where the object 410b illustrates the object 410a in a second position.

If it is determined in block 206 that the most recently processed frame is not the first frame, then, the process proceeds to block 208.

In block 208, the trajectory calculation and element 154 calculates the past trajectory and calculates a predicted future trajectory of the object 410b based on the known position of the object 410a and on the known position of the object 410b. The past trajectory and the predicted future trajectory is illustrated in frame 404 using trajectory line 405. The predicted future position of the object 410b is illustrated in dotted line as object 415.

As an example of calculating the past and predicted future trajectory of an object, assume that two points are located by operation of block 204. The two points can be the center of the object 410a and the center of the object 410b of FIG. 4. The object 410a can be considered to be located at a first point, p1, and the object 410b can be considered to be located at a second point, p2. Using a Cartesian coordinate system where the abscissa (x axis) represents horizontal pixels and the ordinate (y axis) represents vertical pixels, location will be referred to using the convention {x,y}. The point p1 is located at {0,0} at frame 0. The point p2 is located at {100,100} at frame 10. The point p (corresponding to object 415 in frame 406) is a predicted point not yet found. In an embodiment, real world equivalent measurements can be 10 pixels per foot.

The trajectory is calculated based on the object in flight. As such the object (410 in this example) will have a constant set of physical forces applied to it. Specifically accounted for are gravity and drag. The laws of physics dictate that the x and y axis of a projectile are distinct in that forces applied to the y axis will not affect the x axis, and conversely, forces applied to the x axis will not affect the y axis. As such, the calculations for x and y can be done separately.

The position of the object on the x and y axes are calculated using the equation $D=(V_i*T)+(½*A*T^2)$, where:

D=displacement
$V_i$=initial velocity
A=acceleration
T=time (elapsed)

For the x axis prediction calculation, once p1 and p2 are determined, the speed of the object can be calculated. One possible way to measure the speed of the object is in pixels/frame. In this example, p1 will be at position {0,0} and p2 will be at position {100,100} after 10 frames. Acceleration can be ignored in the x axis for purposes of this example. From this information it is determined that:

$V_i$=Distance/Time=(100−0)/10=10 px/frame
A=0 (approximately and ideal)
T=10 frames.

Therefore, D=(10*10)+(0)=100, p3 (the predicted location of the object on the x axis)=p2+100 or an x pixel location of 200. Once the actual location of p3 is found, acceleration can be calculated to improve the accuracy of the prediction.

The y axis prediction calculation is solved in the same manner as the x axis; however, the acceleration, A, can initially be a known constant. Gravity accelerates a projectile at roughly −9.8 m/s².

−9.8 m=−32.1 ft
−32.1 ft/s²*10 px/ft=−321 px/s²
and there are approximately 60 frames per second in HD video, or
−321 px/60 f²
This converts to −5.35 px/frame² in this example.
$V_i$=Distance/Time=(100−0)/10=10 px/frame
A=−5.35 px/frame²
T=10 frames Therefore, D=(10*10)+(½*−5.35*100)=−167.5. Accordingly, p3 (the predicted location of the object on the y axis)= p2+(−167.5) or 67.5 px. This places the predicted location of the object 415 at a predicted point, p3, corresponding to {200, 67.5}.

Once the actual location p3 of the object 410c (FIG. 4) is found, acceleration can be calculated to improve accuracy as −5.35 px/frame² is a theoretical value and may be affected by errors in measurement, changes in altitude, wind resistance, etc.

In block 210, the past trajectory and the predicted future trajectory (i.e., the trajectory line 405) of the object 410 is provided to the trajectory graphics engine 156 so that it can be processed by the display engine 164 and displayed as a spline curve (127, FIG. 1) representing the trajectory of the representation 130 of the object 120 on the display 122.

In block 212, and based on the known trajectory and the predicted trajectory embodied in trajectory line 405, the trajectory calculation element 154 adjusts the area that will be searched to locate the object in subsequent video frames. This is illustrated in FIG. 4 using the predicted frame 406. The predicted frame 406 is a prediction of the third frame, where the prediction is formed by using the information from an actual frame, such as second frame 404. The predicted frame 406 includes a search area 417 that is smaller than the area of the entire frame. For example, the adjusted search area 417 may comprise an area of 700×400 pixels. The size of the adjusted search area 417 is determined based on the predicted trajectory of the object 410 using predicted trajectory line 407 and represents the area within which it is likely that the object 415 will be located in a subsequent (i.e., third in this example) frame. The predicted trajectory line 407 is shown in dotted line in frame 406 because it is predicted, not actual. While a reduction in search area from 1280×720 pixels to 700×400 pixels represents an approximate reduction in search area 417 of 50% compared to the entire frame, subsequent iterations can result in different changes in search area. The original search area and the adjusted search area are also dependent on the size of the object. For example, an object comprising 500×500 pixels will have a different search area, and different adjusted search area, than an object comprising 100×100 pixels.

In block 214, another frame of video is received from the memory 106. In block 216, the most recently received video frame is processed, whereby the object isolation element 152 searches for the object 410 in the adjusted search area 417. As shown in FIG. 4, third frame 408 is an actual frame processed in block 216, showing the adjusted search area 417 processed by the object isolation element 152 to isolate and locate the object 410c. In this manner, the number of processor cycles and processor time consumed by the processor 104 when searching the adjusted search area 417 is greatly reduced in block 216 as compared to the amount of processor resources used by the object isolation element 152 to search the first video frame 402 and the second video frame 404 in block 204. By searching a smaller area (i.e. the adjusted search area 417 in frame 408,) real-time analysis can be achieved so that a near-real time video feed showing object location can be provided on the display 122.

The object 410c is located in the third frame; however, the actual position of the object 410c may differ from the predicted location of the object, shown as object 415 in the predicted frame 406.

In block 218, using the real-time object position information obtained in block 216, a margin of error between the predicted position (415) and the actual position of the object 410c is determined. The margin of error refers to the difference in location between the actual position of the object 410c determined in block 216, and shown in frame 408, and the predicted position of the object 415 determined in block 208, and shown in frame 406. The margin of error is then used to further adjust the search area 419 for a subsequent frame 412 in block 222. The operation of blocks 218 and 222 occurs after the initial two frames are analyzed so as to further refine the search area to further conserve processor resources.

The margin of error determined in block 218 is performed by the object isolation element 152 using information provided by the trajectory calculation element 154. The predicted point, p3, provided by the trajectory calculation element 154 is known by the time the actual object (410c, FIG. 4) is located by the object isolation element 152. By comparing the predicted and actual locations, the object isolation element 152 provides the adjusted search area 419 for a subsequent frame.

To determine the margin of error between the predicted location and the actual location, the distance on the x axis between the predicted location and the actual location; and the distance on the y axis between the predicted location and the actual location are determined For example, assume that the object is a fixed size bounded by a rectangle having a size of 10×10 pixels.

MoE=Margin of Error
SA=Searched Area
SA(N)=Searched area of frame N

To determine SA(N+2), the searched area is calculated by taking the predicted point (Px,Py) and adding a margin of error, MoE, with a plus and minus variance (+/−MoE), which provides a bounding rectangle centered on the searched area ({Px+3, Py+4}, {Px−3, Py−4}).

Because the points used refer to the center of the found object, the size of the object should be considered as the entire object should fit within the search area. This is accomplished by adding the width and height of the object to the total size of the bounding rectangle. Therefore, each point has +/−(W/2) or +/−(10/2) or +/−(5)
({Px+8, Py+9}, {Px−8, Py−9})
({60+8, 60+9}, {60−8, 60−9})

| Frame | Predicted | SA | Actual | MoE |
|---|---|---|---|---|
| N + 1 | 50, 50 | SA (N) | 47, 46 | 3, 4 |
| N + 2 | 60, 60 | {68, 69}, {52, 51} | 66, 64 | 6, 4 |
| N + 3 | 75, 75 | {86, 84}, {64, 66} | 73, 80 | 2, 5 |
| Etc . . . | | | | |

The calculated (i.e., predicted) location of the object and the actual position of the object are compared for a given frame. If the calculated position differs from the actual location then the area searched in a subsequent frame can be expanded or reduced to accommodate that error.

With regard to FIG. 4, the predicted frame 412 illustrates the situation in which the first frame 402, second frame 404 and third frame 408 are processed to arrive at a subsequent predicted frame (f4) showing the predicted location of the object 425 within adjusted search area 419. As shown, the adjusted search area 419 is smaller yet than the adjusted search area 417. The adjusted search area 419 includes a predicted location at which the object 425 would likely be found in a fourth actual frame. The search area is continuously adjusted using a combination of the margin of error and the calculated position. If the prediction techniques were ideal, the search area could be minimized to a size no larger that the size of the object, for example, 10×10 pixels. If the predicted location is historically off by, for example, 30 pixels (this is the margin of error), the search area would be formed so as to comprise an area of 10×10 pixels with a minimum 30 pixel buffer around it ((30+10+30)×(30+10+30) or a search area of 70×70 pixels).

In this manner, the iterative process continually refines the area searched in subsequent frames so as to further reduce processing time and minimize processor cycles.

In block 232, the position of the object 415 is provided to the position graphics engine 158 so that the display engine 164 can cause the object to be displayed in the video presented on the display 122. In block 234, the gauge 124 is animated with an indicator 125 so as to show the height of the representation 130 of the object 120 relative to the gauge 124.

In block 242, the position information received from block 216 (i.e. the position of the object 415 within the frame 408) is stored in the memory 106. In block 244, the position graphics engine 158 compares the current position of the object 415 to a prior position, such as the position of object 410b, or to the position of other located objects. In block 246, the display engine 164 displays the results of the comparison on the display 122.

FIG. 5 is a schematic diagram 500 illustrating actual captured frames and predicted frames. The actual captured frames are shown on the left-hand side of the drawing with corresponding predicted frames shown on the right-hand side of the drawing.

A first captured frame 502 includes object 510a at a first location. A first predicted frame 504 does not include any object position information because the system cannot predict future location based on a single captured frame.

The second captured frame 506 includes the object 510b, which corresponds to object 510a at a second location. A second predicted frame 508 includes the object 510a at the first position, the object 510b at the second location, and a trajectory line 507. The trajectory line 507 includes the past trajectory of the objects 510a and 510b and a predicted trajectory of the future location of the object 510

A third captured frame 512 includes object 510c, which is a third position of the object 510. A third predicted frame 514 shows the object 510c and shows possible trajectory lines 515a and 515b. The possible trajectory lines 515a and 515b illustrate the possible future positions of the object 510. For example, the object 510d shows a possible position of the object 510 along trajectory line 515a and the object 510e shows a possible position of the object 510 along trajectory line 515b Importantly, the objects 510d and 510e represent the predicted position of the object 510 plus or minus the margin of error determined in block 218 of FIG. 2A. Using the positions of the objects 510d and 510e, a bounding shape 535 is created. The bounding shape 535 represents the area within which to search for the object 510. The possible trajectory lines 515a and 515b lines show the possible trajectories based on the margin of error, shown using lines 526a and 526b.

Figure 6:
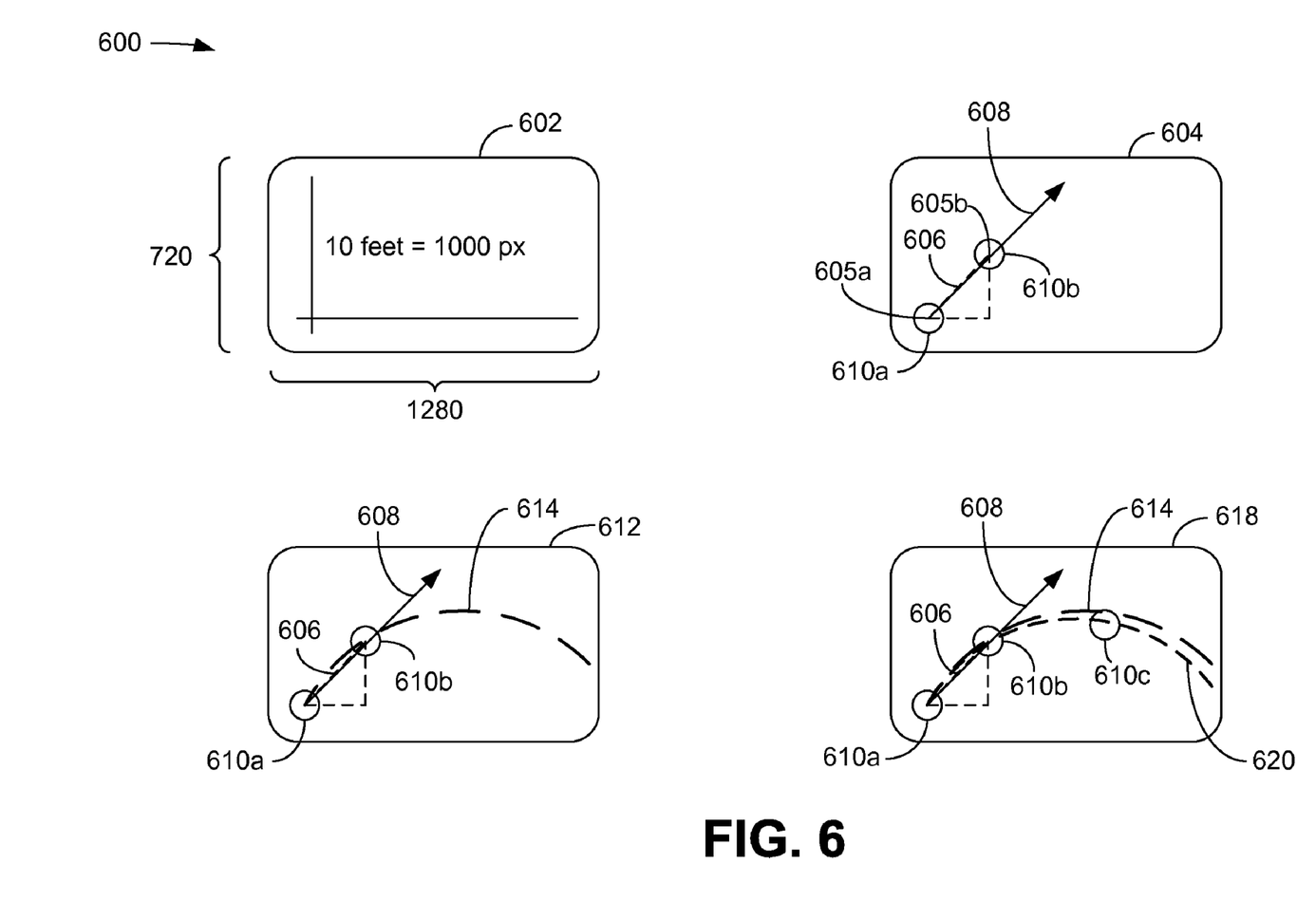
FIG. 6 is a graphical view illustrating a method for calibrating the object location prediction element of FIG. 1.

FIG. 6 is a graphical view illustrating a method for calibrating the object location prediction element 150. A frame 602 contains a certain number of pixels. As mentioned above, the frame 602 can be 1280×720 pixels, in which there are 1280 horizontal pixels and 720 vertical pixels. An arbitrary scale can be created where, for example, 1000 pixels equals 10 feet. Other relationships between distance and the number of pixels are contemplated.

A frame 604 represents a second captured frame that includes a stored representation of the object 610a and the object 610b. After the second frame is captured and processed, a best fit line 608 can be estimated between a center point 605a associated with the object 610a and a center point 605b associated with the object 610b. Because there are two points, a best fit line results in a straight line 606 between the object 610a and the object 610b.

To improve the prediction accuracy, a frame 612 shows the best fit line 608 after being compensated by an estimate for the effect of gravity on the object 610. The line 614 shows the effect of gravity on the best fit line 608.

The frame 618 includes an object 610c, which is a third position of the object 610a and the object 610b. Knowing the location of the object 610c improves the prediction accuracy and gives rise to a multipoint best fit line 620, which more closely approximates the trajectory of the object 610 in future frames.

While various embodiments of the invention have been described, it will be apparent to those of ordinary skill in the art that many more embodiments and implementations are possible that are within the scope of the invention.

What is claimed is:

1. A system for predicting object location, comprising:
   a video capture system for capturing a plurality of video frames, each of the video frames having a first area;
   an object isolation element for locating an object in each of the plurality of video frames, the object being located at a first actual position in a first video frame and being located at a second actual position in a second video frame;
   a trajectory calculation element configured to analyze the first actual position and the second actual position to determine an object trajectory, the object trajectory comprising past trajectory and predicted future trajectory, wherein the predicted future trajectory is used to determine a second area in a third video frame in which to search for the object, wherein the second area is different in size than the first area, in which the object is located in the third video frame at a third actual position; and
   a scoring engine configured to compare the third actual position with the second actual position.

2. The system of claim 1, further comprising a video output comprising position information relating to the object, the position information being shown relative to a performance gauge.

3. The system of claim 1, wherein the scoring engine causes a result of the comparison to be displayed.

4. The system of claim 1, wherein the trajectory calculation element predicts a third location of the object in the third video frame.

5. The system of claim 4, wherein the system further comprises an element configured to compare the predicted third location with the actual third location to determine a margin of error between the predicted third location and the actual third location.

6. The system of claim 5, in which the margin of error is used to determine a third area in a subsequent video frame in which to search for the object, wherein the third area is different in size than the first area and the second area.

7. The system of claim 6, wherein the second area is smaller than the first area and the third area is smaller than the second area.

8. A method for predicting object location, comprising:
   capturing a plurality of video frames, each of the video frames having a first area;
   locating an object in each of the plurality of video frames, the object being located at a first actual position in a first video frame and being located at a second actual position in a second video frame;
   analyzing the first actual position and the second actual position to determine an object trajectory, the object trajectory comprising past trajectory and predicted future trajectory, wherein the predicted future trajectory is used to determine a second area in a third video frame in which to search for the object, wherein the second area is different in size than the first area;
   locating the object at a third actual position in the third video frame; and
   comparing the third actual position with the second actual position.

9. The method of claim 8, further comprising providing a video output comprising position information relating to the object, the position information being shown relative to a performance gauge.

10. The method of claim 9, further comprising displaying a result of the comparison.

11. The method of claim 9, further comprising predicting a third location of the object in the third video frame.

12. The method of claim 11, further comprising:
    comparing the predicted third location with the actual third location to determine a margin of error between the predicted third location the actual third location.

13. The method of claim 12, further comprising determining a third area in a subsequent video frame in which to locate the object, wherein the third area is different in size than the first area and the second area.

14. The method of claim 13, wherein the second area is smaller than the first area and the third area is smaller than the second area.

15. A method for predicting object location, comprising:
    capturing a plurality of video frames, each of the video frames having a first area;
    locating an object in each of the plurality of video frames, the object being located at a first actual position in a first video frame and being located at a second actual position in a second video frame;

analyzing the first actual position and the second actual position to determine an object trajectory, the object trajectory comprising past trajectory and predicted future trajectory, wherein the predicted future trajectory is used to determine a predicted third location in a second area in a third video frame in which to search for the object, wherein the second area is different in size than the first area;

locating the object at a third actual position in the third video frame;

comparing the third actual position with the second actual position to determine a margin of error between the predicted third location and the actual third location; and providing a video output comprising position information relating to the object, the position information being shown relative to a performance gauge.

16. The method of claim 15, further comprising determining a third area in a subsequent video frame in which to search for the object, wherein the third area is different in size than the first area and the second area.

17. The method of claim 16, wherein the second area is smaller than the first area and the third area is smaller than the second area.

* * * * *